United States Patent [19]  
Silverwood

[11] 3,869,531  
[45] Mar. 4, 1975

[54] ADHESION OF URETHANE FOAMS TO PVC SKINS
[75] Inventor: Hartley A. Silverwood, Durham, N.H.
[73] Assignee: McCord Corporation, Detroit, Mich.
[22] Filed: Feb. 21, 1974
[21] Appl. No.: 444,478

[52] U.S. Cl. .................. 264/46.6 AP, 260/2.5 BE
[51] Int. Cl. ............................................. B29d 27/00
[58] Field of Search ......... 264/45; 260/2.5 BE, 78.3

[56] References Cited
UNITED STATES PATENTS
3,123,403    3/1964    Hood ............................... 297/412
3,169,945    2/1965    Hostettler et al. ................. 260/78.3
3,535,196   10/1970    Laberinti et al ................. 260/2.5 BE Primary Examiner—Robert F. White  
Assistant Examiner—Gene Auville  
Attorney, Agent, or Firm—McGlynn and Milton

[57] ABSTRACT

The adhesion of a urethane foam to a PVC skin in which it has been foamed in situ is greatly improved by adding to the foam formulation a small amount of polycaprolactone polyol, specifically a 1,500 to 4,000 molecular weight polycaprolactone-diethyleneglycol adipate copolymer.

2 Claims, No Drawings

ADHESION OF URETHANE FOAMS TO PVC SKINS

In the manufacture of foam-filled articles with polyvinylchloride (PVC) skins or shells in the manner of the Hood Patent U.S. Pat. No. 3,123,403, some designs or configurations require higher than ordinary adhesion between the PVC skin and the urethane foam. The foam is usually of the prepolymer-polyether type.

It has now been found that the adhesion, peel strength or the like between the PVC skins and the urethane foam formed in situ can unexpectedly be increased several fold by adding to form formulation in the range of 0.5 to 2 weight percent based on total weight of form of a 1,000–4,000 molecular weight polycaprolactonepolyol and specifically a polycaprolactone-diethylene glycol adipate copolymer. The reason why this so markedly improves the interfacial bonding is not known at this time.

It has been suggested that polyols of this general type may be added to PVC formulations and may be used as reactants in urethane foam formulations, see the Hostettler patent U.S. Pat. No. 3,169,945. It is not known, however, to use such polyols in the amounts of the types here used as a chemical additive to improve bonding of urethane foam to surfaces against which they are foamed.

It is believed that the improved bonding will be obtained when the urethane foam containing the chemical additive is foamed against other flexible plastic shells or skins such as vacuum-formed ABS sheet.

The following illustrates this invention:

PVC FORMULATION

| | Parts by Weight |
|---|---|
| PVC-Resin (1) | 100 |
| Plasticizer (DIDP) | 90 |
| Epoxidized oil (2) | 3 |
| Stabilizer (3) | 4 |
| (Pigment) | |
| TOTAL | 197 |

(1) Borden Chemical's VC-100
(2) Rohm & Haas Paraplex G-62
(3) Tenneco Chemicals V-1783

A skin is prepared for a 1974 Ford corporate arm rest, for example, for part number D4AB-6524100-/1-AWB or part number D4AB-6531718/9-AWB from the above PVC formulation using the method of the Wersosky Patent U.S. Pat. No. 3,315,016. The plastisol formulation disclosed in the Wersosky patent will work as well.

URETHANE FORM FORMULATION

| Component A | | | Component B (prepolymer) | |
|---|---|---|---|---|
| Polyether-A (1) | 85.1 | parts | Polyether-B (4) | 90 |
| 14.6% soln. Dabco | 3.8 | | Polyether-C (5) | 10 |
| Zn Stearate | 2.4 | | Catalyst (6) | 0.09 |
| Triethanolamine | 7.6 | | TDI 80/20 | 75.3 |
| Carbon Black | 0.766 | | Flame Retardant (7) | 5.3 |
| Surfactant (2) | 0.33 | | Adhesion Promotor (8) | 2.8 |
| Silicone (3) | 0.004 | | | |

(1) Wyandotte Chemicals P-324
(2) Atlas Chemical's BRIJ-76
(3) General Electric's silicone SF-96
(4) Wyandotte Chemical's GP-3030
(5) Cadillac Plastic's and Chemical's MEG-430
(6) Witco Chemical's C-7, an organo-tin type catalyst
(7) Monsanto's Phosgrad C-22R, a halogenated organic polyphosphonate
(8) Union Carbide's D-756, a 2000 molecular weight polycaprolactone-diethylene glycol adipate copolymer. Note: Union Carbide's 3000 molecular weight D-737 and 200 molecular weight D-560 polycaproloctone polyols will work about as well.

The prepolyer component of the above foam formulation is made by simply mixing the ingredients at room temperature, allowing the mixture to exotherm to 200°F with stirring for 15 minutes then cooling.

The arm rest is made in the manner of the Hood Patent U.S. Pat. No. 3,123,403 by injecting a metered amount of components A and B through a mixing head into the PVC skin retained in a suitable mold, and allowing the foam reaction to go to completion.

Tests were run with the above foam formulation by foaming it against the flexible PVC skins for the 1974 Ford corporate arm rest, with and without the adhesion promoter having been added to the foam formulations. Ply adhesion numbers as determined by ASTM-D-413 averaged 0.1 pounds per inch without the adhesion promoter and with about one weight percent thereof being present (2.8 parts by weight on the above formulation) the ply adhesion ranged from 0.9 to 1.0 pounds per inch.

I claim:

1. In the manufacture of an automobile trim component comprising a covering of a flexible plasticized polyvinylchloride resin filled with a urethane polyether foam foamed in situ by the prepolymer technique, the improvement for increasing the adhesion to said covering by said foam comprising adding to the reactants for said foam in the range of 0.5 to 2 weight percent of a polyol consisting of a 1000 to 4000 molecular weight polycaprolactone diethylene glycol adipate copolymer, as an adhesion improving additive.

2. In the manufacture of a padded article comprising a flexible plasticized polyvinylchloride covering filled with a urethane foam foamed in situ, the improvement which increases the adhesion between said covering and said foam comprising adding to the reactants for said foam in the range of 0.5 to 2 weight percent of a 1,000 to 4,000 molecular weight polycaprolactone polyol.

* * * * *